(12) United States Patent
Lin et al.

(10) Patent No.: US 11,733,807 B2
(45) Date of Patent: Aug. 22, 2023

(54) LIGHT SENSING DISPLAY

(71) Applicant: Apple Inc., Cupertino, CA (US)

(72) Inventors: Hung Sheng Lin, San Jose, CA (US);
Chin-Wei Lin, San Jose, CA (US);
Tsung-Ting Tsai, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 151 days.

(21) Appl. No.: 15/761,603

(22) PCT Filed: Jul. 18, 2016

(86) PCT No.: PCT/US2016/042829
§ 371 (c)(1),
(2) Date: Mar. 20, 2018

(87) PCT Pub. No.: WO2017/052727
PCT Pub. Date: Mar. 30, 2017

(65) Prior Publication Data
US 2018/0348959 A1    Dec. 6, 2018

Related U.S. Application Data

(60) Provisional application No. 62/233,208, filed on Sep. 25, 2015.

(51) Int. Cl.
*G06F 3/042* (2006.01)
*G06F 3/041* (2006.01)
(Continued)

(52) U.S. Cl.
CPC ............ *G06F 3/0421* (2013.01); *G06F 3/042* (2013.01); *G06F 3/0412* (2013.01);
(Continued)

(58) Field of Classification Search
None
See application file for complete search history.

(56) References Cited

U.S. PATENT DOCUMENTS 9,183,779 B2    11/2015    Soto
2001/0052597 A1    12/2001    Young et al.
(Continued)

OTHER PUBLICATIONS

U.S. Appl. No. 62/181,718, filed Jun. 2015, He, Yi.*

*Primary Examiner* — Ifedayo B Iluyomade
(74) *Attorney, Agent, or Firm* — Treyz Law Group, P.C.; G. Victor Treyz; Kendall P. Woodruff

(57) ABSTRACT

A display may have an array of pixels. The pixels may contain light-emitting diodes. When it is desired to use the display to operate as a light sensor, some of the light-emitting diodes may be forward biased to emit light while some of the light-emitting diodes are reversed biased to detect the emitted light after the emitted light has reflected from an external object. During light sensing operations, one or more areas of the display may be temporarily deactivated so that the light-sensing pixels may measure the reflected light. Vertical lines may serve both as data loading lines and as current sensing lines. Currents may be sensed during drive transistor current compensation and during light sensing. The vertical lines may load signals into the pixels that forward bias the light-emitting diodes to emit light when it is desired to display images for a user.

20 Claims, 9 Drawing Sheets

(51) Int. Cl.
  *G09G 3/3233* (2016.01)
  *G09G 3/36* (2006.01)
  *G09G 3/3258* (2016.01)

(52) U.S. Cl.
  CPC ......... *G09G 3/3233* (2013.01); *G09G 3/3258* (2013.01); *G09G 3/3659* (2013.01); *G09G 2310/0297* (2013.01); *G09G 2320/0295* (2013.01); *G09G 2360/148* (2013.01)

(56) References Cited

U.S. PATENT DOCUMENTS

| | | | |
|---|---|---|---|
| 2003/0122749 A1* | 7/2003 | Booth, Jr. | G06F 3/03542 345/82 |
| 2009/0002590 A1* | 1/2009 | Kimura | H01L 27/1214 438/151 |
| 2010/0302266 A1* | 12/2010 | Morita | G09G 3/3688 345/559 |
| 2013/0147694 A1* | 6/2013 | Kim | G09G 3/3233 345/82 |
| 2014/0254131 A1* | 9/2014 | Osinski | B82Y 20/00 |
| 2015/0055051 A1 | 2/2015 | Osawa et al. | |
| 2016/0206212 A1* | 7/2016 | Lee | A61B 5/6801 |
| 2017/0075700 A1* | 3/2017 | Abudi | G06F 3/0484 |
| 2017/0270342 A1* | 9/2017 | He | G06F 3/0418 |

* cited by examiner

LIGHT SENSING DISPLAY

This application claims priority to provisional patent application No. 62/233,208, filed Sep. 25, 2015, which is hereby incorporated by reference herein in its entirety.

BACKGROUND

This relates generally to electronic devices and, more particularly, to electronic devices with displays.

Electronic devices often include displays. A display may have an array of pixels for displaying images. In displays such as organic light-emitting diode displays, each pixel may contain a light-emitting diode and thin-film transistor circuitry that controls current flow through the organic light-emitting diode.

Some displays contain touch sensors. Touch sensitive displays may, for example, have capacitive touch sensors. A capacitive touch sensor has an array of capacitive touch sensor electrodes for making measurements on the location of a user's finger or other external object.

Challenges are involved in forming satisfactory displays. If care is not taken, a display such as a conventional touch sensitive display may not be able to capture as much information as desired.

It would therefore be desirable to be able to provide displays with enhanced abilities for gathering input.

SUMMARY

A display may have an array of pixels. The pixels may contain light-emitting diodes. The light-emitting diodes may be organic light-emitting diodes, quantum dot light-emitting diodes, or light-emitting diodes formed in discrete crystalline semiconductor dies.

The display may have horizontal control lines and vertical lines that run perpendicular to the horizontal control lines. The horizontal control lines may carry signals such as emission control signals and scan line signals. The vertical lines may serve both as data loading lines and as current sensing lines.

The vertical lines may load signals into the pixels that forward bias the light-emitting diodes to emit light when it is desired to display images for a user. When it is desired to use the display to operate as a light sensor, some of the light-emitting diodes may be forward biased to emit light while some of the light-emitting diodes may be reversed biased to detect the emitted light after the emitted light has reflected from an external object. During light sensing operations, one or more areas of the display that would otherwise be used in displaying images may be temporarily deactivated so that the light-sensing pixels may measure the reflected light without interference from adjacent image pixels.

Further features will be more apparent from the accompanying drawings and the following detailed description.

DETAILED DESCRIPTION

Figure 1:
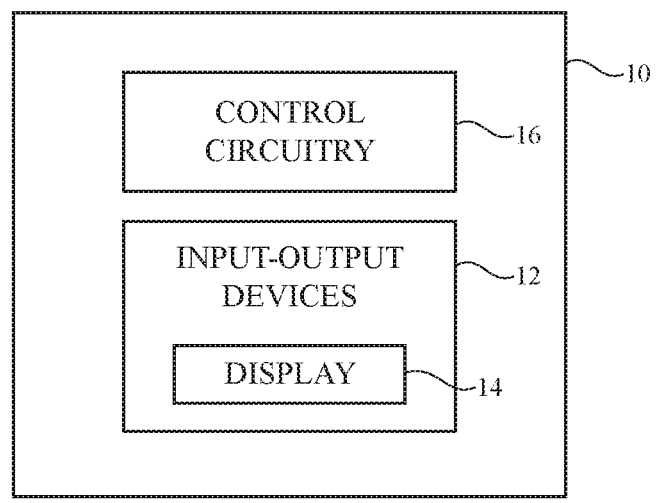
FIG. 1 is a diagram of an illustrative electronic device having a display in accordance with an embodiment.

An illustrative electronic device of the type that may be provided with a display is shown in FIG. 1. As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Display 14 may have pixels that can be adjusted to emit light or to detect light. The pixels of display 14 may, for example, include light-emitting diodes (e.g., organic light-emitting diodes, quantum dot light-emitting diodes, light-emitting diodes based on discrete crystalline semiconductor dies, or other light-emitting diodes). During normal light emission operations, the light-emitting diodes may be forward biased to emit light. During light sensing operations, the light-emitting diodes may be reversed biased to detect light. Nearby light-emitting diodes may emit light during light sensing. The emitted light may be scattered from the surface of external objects and detected by the reverse-based light-emitting diodes. Using this arrangement, fingerprints, documents, and other items may be scanned, touch input can be gathered (e.g., touch gestures and other input can be obtained without using a capacitive touch sensor array in display 14 or in addition to using a capacitive touch sensor array in display 14), and other input may be gathered.

Control circuitry 16 may be used to run software on device 10 such as operating system code and applications. During operation of device 10, the software running on control circuitry 16 may display images on display 14 and may use the touch sensing and/or light-based sensing capabilities of display 14 to gather input on a user's fingers, the user's fingerprints, and information from other external objects.

Figure 2:
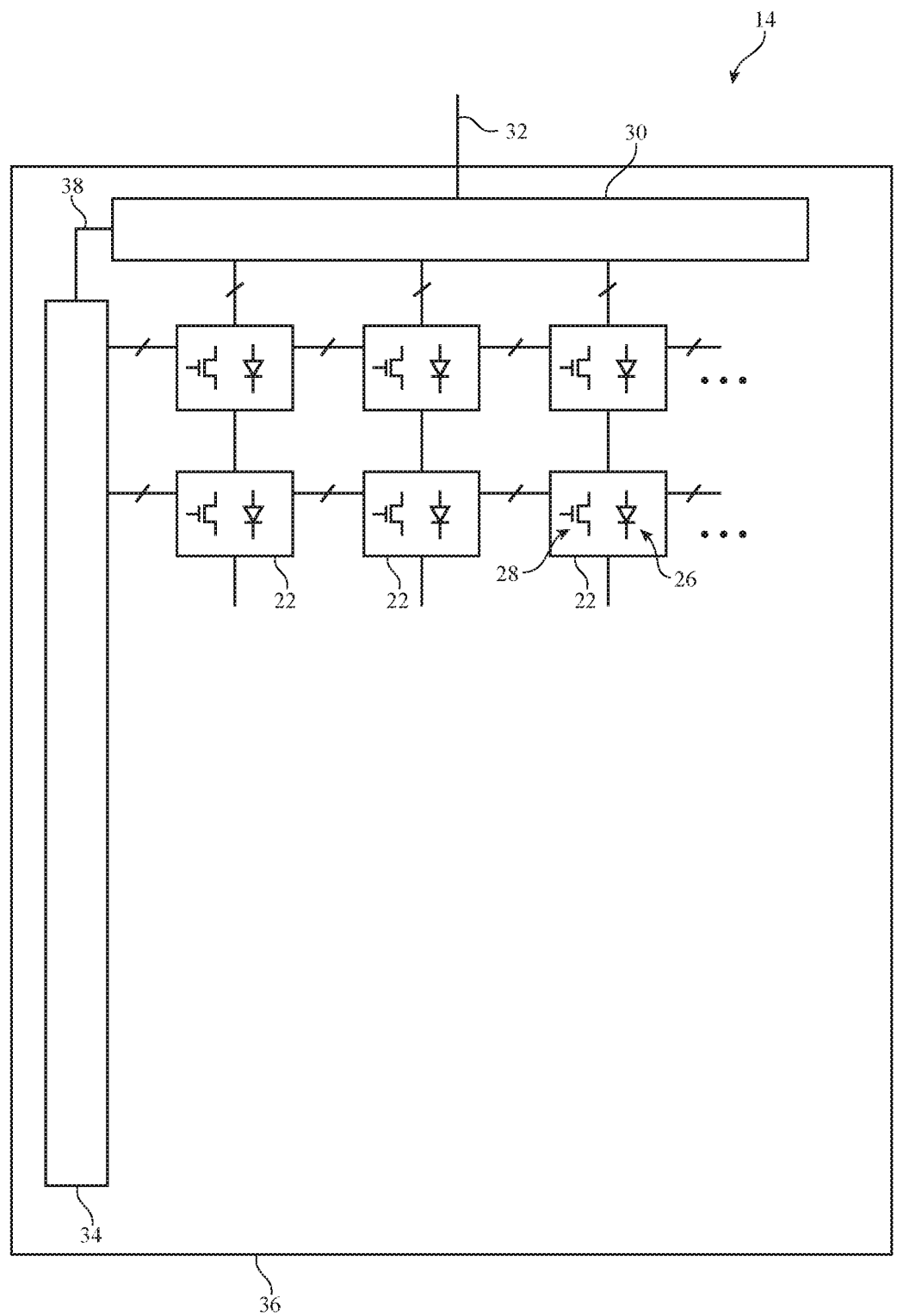
FIG. 2 is a diagram of an illustrative display in accordance with an embodiment.

FIG. 2 is a diagram of an illustrative display. As shown in FIG. 2, display 14 may have an array of pixels 22 for displaying images for a user. The array of pixels 22 may be arranged to form rows and columns. There may be any suitable number of rows and columns in the array of pixels 22 (e.g., ten or more, one hundred or more, or one thousand or more). Pixels 22 may each contain subpixels of different colors. As an example, each pixel 22 may have a red subpixel that emits red light, a green subpixel that emits green light, and a blue subpixel that emits blue light. Configurations for display 14 that include subpixels of other colors may be used, if desired.

Display driver circuitry (sometimes referred to as display circuitry or display control circuitry) may be used to control the operation of pixels 22. The display driver circuitry may be formed from integrated circuits, thin-film transistor circuits, or other suitable circuitry. Display driver circuitry 30 of FIG. 2 may contain communications circuitry for communicating with system control circuitry such as control circuitry 16 of FIG. 1 over path 32. Path 32 may be formed from traces on a flexible printed circuit or other cable. During operation, the control circuitry (e.g., control circuitry 16 of FIG. 1) may supply circuitry 30 with information on images to be displayed on display 14.

To display the images on display pixels 22, display driver circuitry 30 may supply image data to data lines D while issuing clock signals and other control signals to supporting display driver circuitry such as gate driver circuitry 34 over path 38. If desired, circuitry 30 may also supply clock signals and other control signals to gate driver circuitry on an opposing edge of display 14.

Gate driver circuitry 34 (sometimes referred to as horizontal control line control circuitry) may be implemented as part of an integrated circuit and/or may be implemented using thin-film transistor circuitry. Horizontal control lines (sometimes referred to as gate lines) in display 14 may include scan line signals, emission enable control signals, and other horizontal control signals for controlling the pixels of each row. There may be any suitable number of horizontal lines per row of pixels 22 (e.g., one or more, two or more, three or more, four or more, etc.).

The circuitry for each pixel 22 may include a light-emitting diode such as diode 26 (e.g., an organic light-emitting diode, a quantum dot light-emitting diode, a discrete semiconductor light-emitting diode die, etc.) and a pixel circuit formed from transistors 28 (e.g., thin-film transistors) that controls the flow of current through diode 26 and thereby controls the amount of emitted light 24 from that pixel. When it is desired to use the light-emitting diode or other component (e.g., one of the thin-film transistors) in a pixel to detect light, the pixel circuit of that pixel may be configured to reverse-bias the diode or to otherwise configure the pixel for making light measurements.

The pixel circuits may each include a drive transistor that is coupled in series with a respective diode 26 and that controls current flow through that diode, supporting transistors (e.g., control transistors such as emission enable control transistors and switching transistors), and other circuitry (e.g., one or more thin-film capacitors such as a data storage capacitor Cst). The supporting transistors and other circuitry of each pixel circuit may be used in performing data loading operations, transistor drive current compensation operations (e.g., to compensate for variations in transistor performance due to factors such as operating temperature, threshold voltage shifts, changes in semiconductor mobility, aging effects, etc.), light emission operations (forward biasing one of diodes 26), and light sensing operations (reverse biasing one of diodes 26).

In addition to vertical line such as vertical data lines and horizontal control liens, display 14 may include global power supply lines and reference voltage lines (sometimes referred to as initialization voltage lines).

Figure 3:
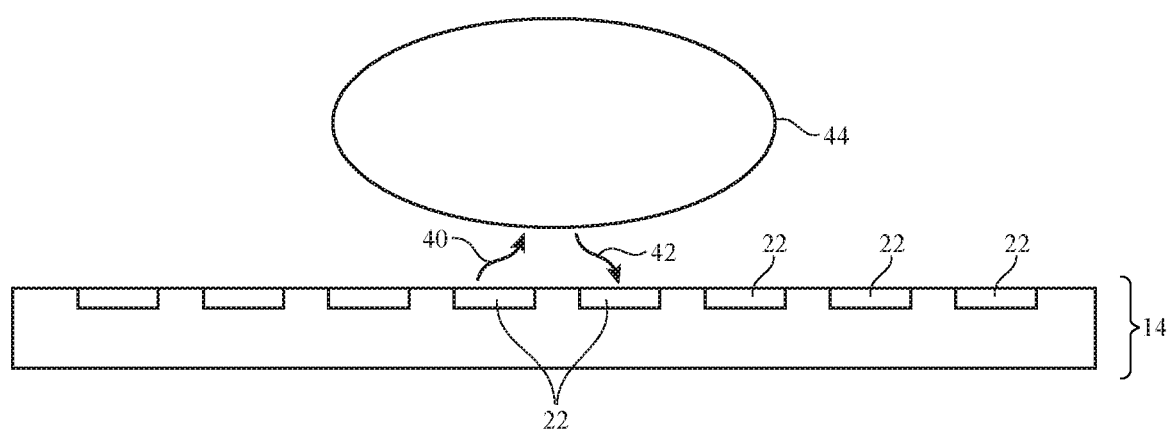
FIG. 3 is a cross-sectional side view of an illustrative display and an external object that is being sensed using the display in accordance with an embodiment.

A cross-sectional side view of display 14 is shown in FIG. 3. As shown in FIG. 3, pixels 22 may be configured to emit light 40. Emitted light 40 from pixels 22 may be used to display images on display 14 for a user. In some situations, the pixels of display 14 may be used to form a light-based sensor that makes measurements on external objects in the vicinity of display 14. In the example of FIG. 3, measurements are being made on external object 44. External object 44 may include one or more fingers of a user, may be a stylus, may be a document or other item to be scanned, or may be any other external object. Light-sensor measurements may be made on a row-by-row basis (e.g., by scanning through multiple rows in display 14 while making light sensor measurements using some or all of the pixels in those rows).

All of display 14 may be placed in a sensor mode to make measurements on object 44 or a portion of display 14 in the vicinity of object 44 may be used to make measurements on object 44. As measurements are made, some of pixels 22 under object 44 produce light 40 that serves as illumination for object 44. For example, if object 44 is the finger of a user, light 40 may illuminate the fingerprint surface of the finger. When the lower surface of object 44 (i.e., the surface of object 44 that is in contact with display 14 or that is adjacent to display 14) is illuminated in this way, a portion of light 40 that strikes the lower surface of object 44 will be reflected off of object 44 as reflected light 42. Some of the pixels 22 of display 14 (e.g., some of the pixels 22 in an area under object 44) may be placed in a light sensing mode (e.g., by reverse biasing the diodes within those pixels) to detect reflected light 42. Based on the light measurements made on light 42, a fingerprint can be detected, a scanned image of a document or other object can be reconstructed, or other types of input from object 44 can be obtained (e.g., touch gestures, etc.).

Figure 4:
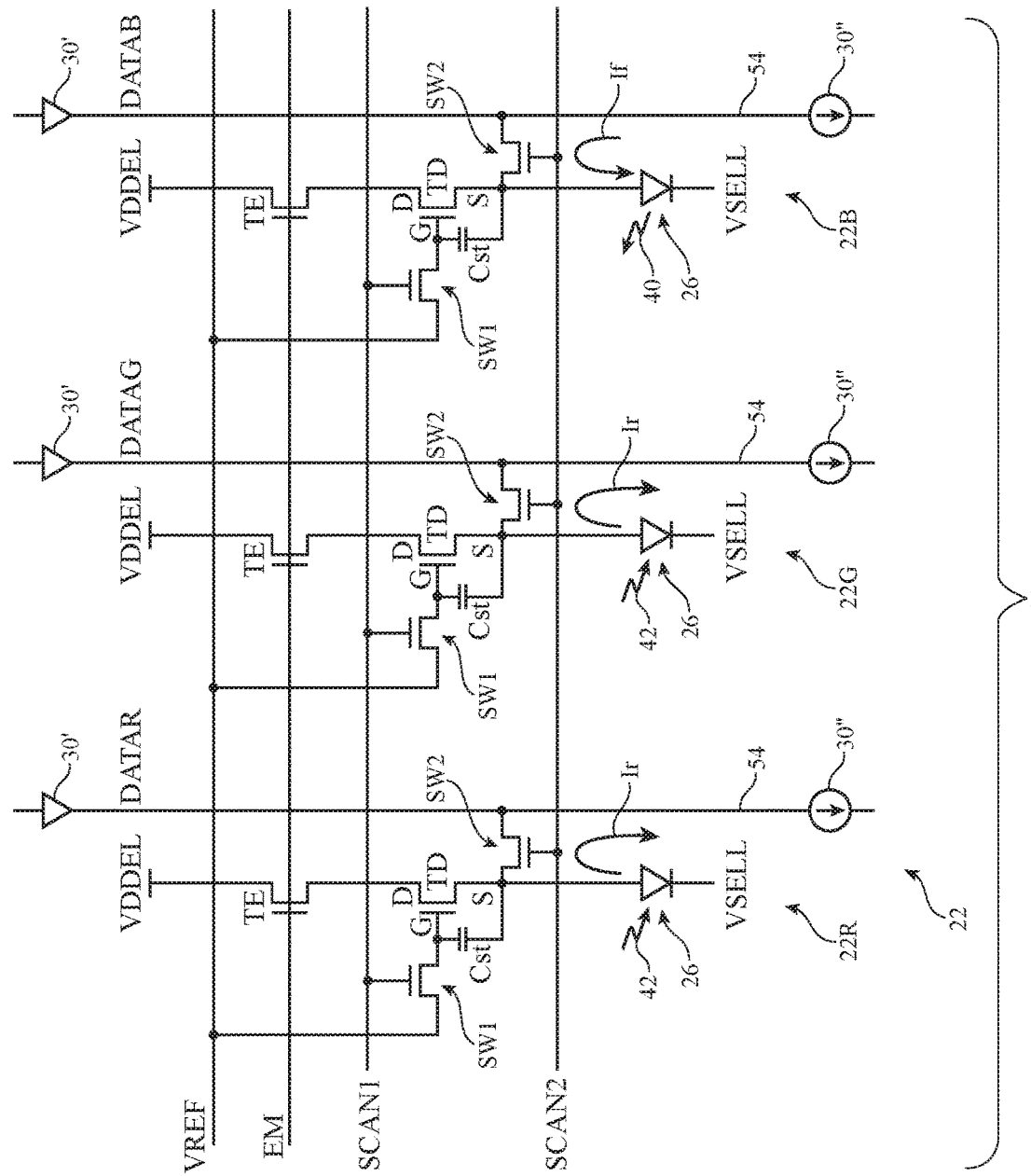
FIG. 4 is a circuit diagram of an illustrative display in accordance with an embodiment.

Illustrative pixel circuitry for display 14 is shown in FIG. 4. In the example of FIG. 4, illustrative pixel circuits are shown for three pixels 22: red pixel 22R, green pixel 22G, and blue pixel 22B. Each pixel 22 has a light-emitting diode 26, a drive transistor TD connected in series with the diode for controlling current flow through the diode, control transistors (switching transistors) SW1 and SW2 controlled by respective control lines (scan lines) SCAN1 and SCAN2, and a control transistor such as emission enable transistor TE that is controlled by emission control signals on an emission control line EM. A global reference voltage path Vref (sometimes referred to as an initialization voltage line) may be used to supply a reference voltage to pixels 22).

Transistors such as drive transistors TD may experience performance variations over time (e.g., due to changes in temperature, aging effects, etc.). To compensate for these changes and therefore ensure that images are displayed accurately, display control circuitry such as circuitry 30 may periodically use current sensing circuitry 30'' to monitor how much current is flowing in each drive transistor under predefined conditions. This current sensing operation (which may sometimes be referred to as a driver current compensation operations) may be performed using separate lines running to each pixel (so that each driver transistor can be individually evaluated).

In the illustrative pixel circuit configuration of FIG. 4, there is a different respective vertical line 54 associated with each column of pixels, which allows the pixels in a given row to be individually evaluated during current sensing. During current sensing, lines 54 serve as current sensing lines. During data loading operations (sometimes referred to as programming operations), data is loaded into pixels 22 via display driver circuitry 30' and lines 54. Lines 54 therefore serve as data lines during data loading.

Because it is desirable for both data loading operations and current sensing operations to use separate lines for each of the pixels in a row of pixels (and because data loading and current sensing operations take place at different times), the ability to share lines 54 between data loading and current sensing operations helps reduce the total number of separate lines running vertically through display 14.

Reference voltage lines VREF may be global lines (i.e., VREF lines in different rows and columns of the array of pixels 22 in display 14 may be shorted together to reduce routing overhead). Positive power supply lines VDDEL and ground power supply lines VSSEL may also be global lines. There is preferably an emission line EM and two separate scan lines SCAN1 and SCAN2 in each row of pixels. If desired, other numbers of horizontal control lines may be used in controlling pixels 22. The example of FIG. 4 is merely illustrative.

During normal operation, pixels 22 all are forward biased (each by a respective amount dictated by the data loaded into that pixel). In particular, the data loaded into each pixel determines the gate-source voltage Vgs of the drive transistor TD in that pixel and thereby determines the current flowing through its diode 26 and the amount of emitted light 40 from that pixel.

When it is desired to use a portion of display 14 as a light-based sensor of the type described in connection with FIG. 3, some pixels (e.g., some of the pixels in a currently active row) are configured to emit light 40 and some pixels (e.g., other pixels in the same currently active row) are configured to serve as light detectors to measure reflected light 42. Any suitable pixels may be used in emitting light 40 and any suitable pixels may be used in sensing reflected light 42 (or in sensing ambient light). In the illustrative example of FIG. 4, data line DATAB in blue pixel 22B has been taken high to forward bias the diode 26 in blue pixel 22B (see, e.g., forward bias current If). This causes the diode in the blue pixel 22B to emit light 40 that is reflected off of an external object such as object 44 of FIG. 3. The data lines DATAR and DATAG in red pixel 22R and green pixel 22G, respectively, are taken low to reverse bias the diodes 26 in the red and green pixels (see, e.g., reverse bias current Ir). Diodes 26 in the red and green pixels serve as light sensors.

The amount of reverse bias current that flows through these diodes is proportional to the magnitude of reflected light 42. If desired, nearby pixels (e.g., pixels that are not needed to illuminate the external object and pixels that are not currently being used as sensors) can be temporarily deactivated to avoid interference with the light sensing operations being performed.

Figure 5:
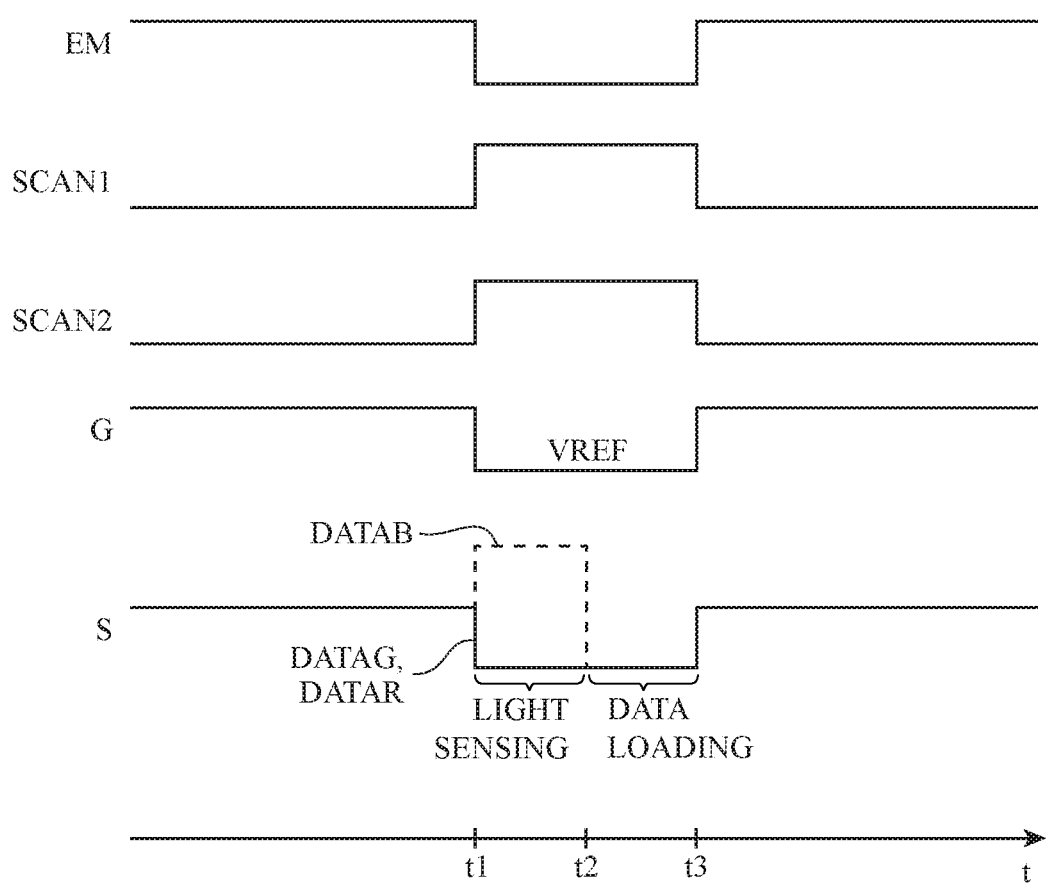
FIG. 5 is a signal timing diagram showing how the display circuitry of FIG. 4 may be used to perform light sensing operations in accordance with an embodiment.

FIG. 5 is an illustrative signal timing diagram for display pixel circuitry of the type shown in FIG. 4. The signal on emission line EM may be asserted to enable light emission (i.e., by allowing current to flow through driver transistor TD in response to loading of an appropriate data signal). The signal on emission line EM may be deasserted (e.g., taken low when transistor TE is an n-channel transistor) when light emission is not desired. In the example of FIG. 5, the emission signal is deasserted at time t1. Signal SCAN1 may be asserted and signal SCAN2 may be asserted and a desired value of reference voltage VREF may be placed onto the gate of transistor TD in preparation for data loading operations at times t2-t3. During times between time t1 and time t2, the states of data lines 54 may be controlled so as to forward bias diode 26 in blue pixel 22B (i.e., DATAB may be taken high between t1 and t2) and so as to reverse bias diodes 26 in red pixel 22R and green pixel 22G (i.e., DATAR and DATAG may be taken low between t1 and t2). The signals loaded into the pixels during light sensing operations ensure that some of the pixels in a row emit light to illuminate an external object while other pixels in the row sense the emitted light that has reflected from the external object.

During data loading at times between t2 and t3, a desired data value is placed on source S of drive transistor TD from data line 54 via transistor SW2 (which is on because SCAN2 is high). Signal SCAN1 is also high, so transistor SW1 is on and voltage reference VREF is provided to the gate G of drive transistor TD. In this way, a desired Vgs value for transistor TD is established during the data loading operations between times t2 and t3. The value of Vgs determines the drive current for transistor TD and diode 26 and therefore the amount of image light emitted by that diode.

Figure 6:
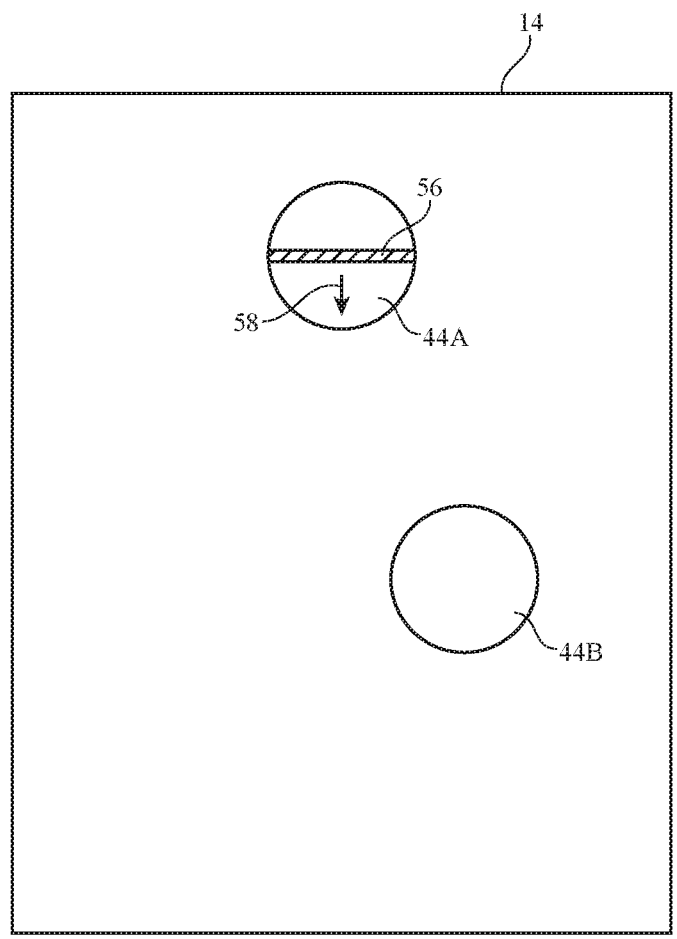
FIG. 6 is a diagram showing illustrative locations on a display that have been contacted by external objects and that contain temporarily deactivated pixels to prevent interference between with light sensing circuitry in the display in accordance with an embodiment.

If desired, portions of display 14 may be darkened to help reduce interference with light sensing (scanning) operations. In the illustrative example of FIG. 6, a user has place fingers or other external objects in areas 44A and 44B. Using touch sensor circuitry in display 14 or using light signals, control circuitry 16 can determine the locations of areas 44A and 44B and can temporarily deactivate (turn off) the pixels in those areas while continuing to display images in the remainder of display 14. In the example of FIG. 6, row 56 (line) of area 44A is being scanned by turning on the blue pixels of that row while sensing reflected light with the red and green pixels of that row. As indicated by arrow 58, the position of row 56 may move so that all of areas 44A and 44B may be scanned. Because the portions of area 44A other than row 56 are off, interference with the sensing operations of row 56 will be minimized. If desired, areas such as area 44A and 44B may remain active during sensing operations (e.g., by taking into account the brightness of the light-emitting pixels in these regions during light sensing operations)

As the example of FIG. 5 demonstrates, display 14 can support data loading operations, emission operations, and light-sensing operations.

To conserve power, it may be desirable to support variable refresh rate (VRR) operations with display 14. In a variable refresh rate scheme, the refresh rate for display 14 may be slowed whenever it is not necessary to use a normal refresh rate (e.g., 60 Hz or 120 Hz) for display 14. As an example, the refresh rate may be slowed to 4 Hz or 1 Hz in the absence of moving content. To support variable refresh rate operations, it may be desirable to use transistors in the pixel circuits of display 14 that exhibit low leakage. In general, any suitable types of transistors may be used in forming the transistor circuitry of pixels 22. For example, transistors may be formed using thin-film transistor structures such as semiconducting-oxide thin-film transistors and silicon thin-film transistors. Semiconducting-oxide transistors may have active regions (channels) formed from semiconducting oxides (e.g., indium gallium zinc oxide, etc.). Silicon transistors may have active regions formed from silicon (e.g., low temperature polysilicon).

To support low leakage currents, it may be desirable to form some or all of the transistors of pixels 22 from semiconducting-oxide transistors. Semiconducting-oxide transistors may tend to be slower than silicon transistors, however, so hybrid designs that incorporate at least some silicon transistors may be desirable. In hybrid designs, silicon transistors can handle operations such as current driving and data loading operations (e.g., operations where strong and fast transistors are desirable), whereas semiconducting-oxide transistors may be used where low-leakage current operation is desirable and where the attributes of silicon transistors are not required.

With one illustrative configuration, transistors TE, TD, and SW2 are formed from silicon transistors, whereas transistor SW1 is a semiconducting-oxide transistor. (If desired, transistor SW2 may also be a semiconducting-oxide transistor.) When forming TE, TD, and SW2 from silicon and transistor SW1 from semiconducting-oxide material, a lower refresh rate is achievable. The semiconducting-oxide transistor (transistor SW1) has low leakage, which helps maintain a desired data voltage on storage capacitor Cst at gate G of transistor TD. Data loading time (charging time) will not be overly limited by the relatively slow performance of transistor SW1, because data is loaded onto source terminal S via data line 54 and silicon transistor SW2. The signal voltages for this type of pixel circuit may be as follows: reference voltage Vref may be less than 1.5 volts, VDDEL may be 7 to 10 volts, DATA may be −3 volts to 1.5 volts, EM, SCAN1, and SCAN2 may be −4 volts to 14 volts, and VSSEL may be 0 volts. As another example, VREF may be 0 volts, VDDEL may be 5.5 to 8.5 volts, DATA may be −4.5 to 0 volts, EM, SCAN1, and SCAN2 may be −5.5 volts to 12.5 volts, and VSSEL may be −1.5 volts. These are merely illustrative examples. Other voltages may be used in operating the pixel circuit if desired.

Figure 7:
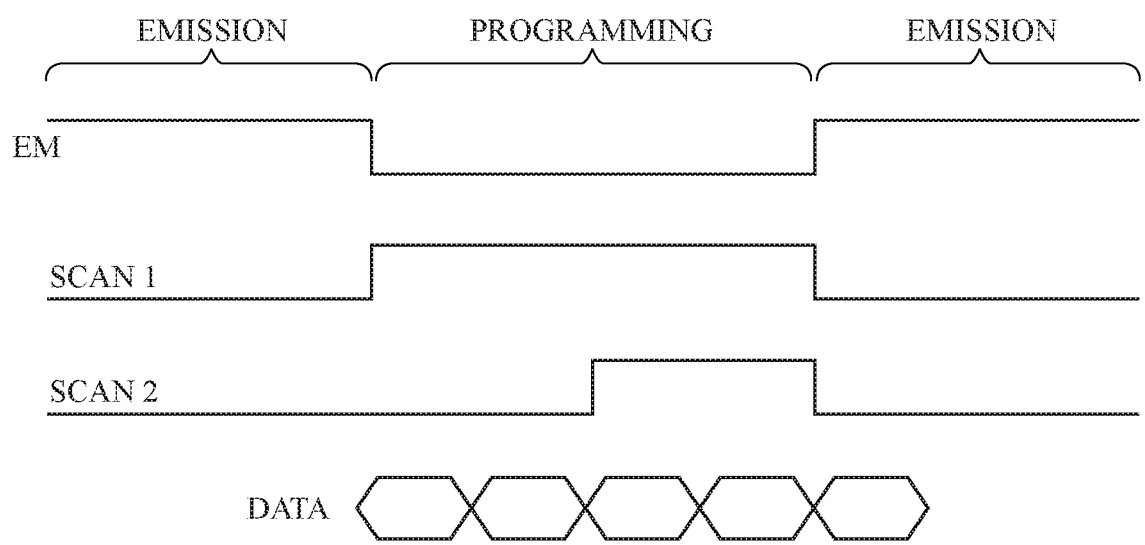
FIG. 7 is a signal timing diagram showing how a display may be loaded with data in accordance with an embodiment.
Figure 8:
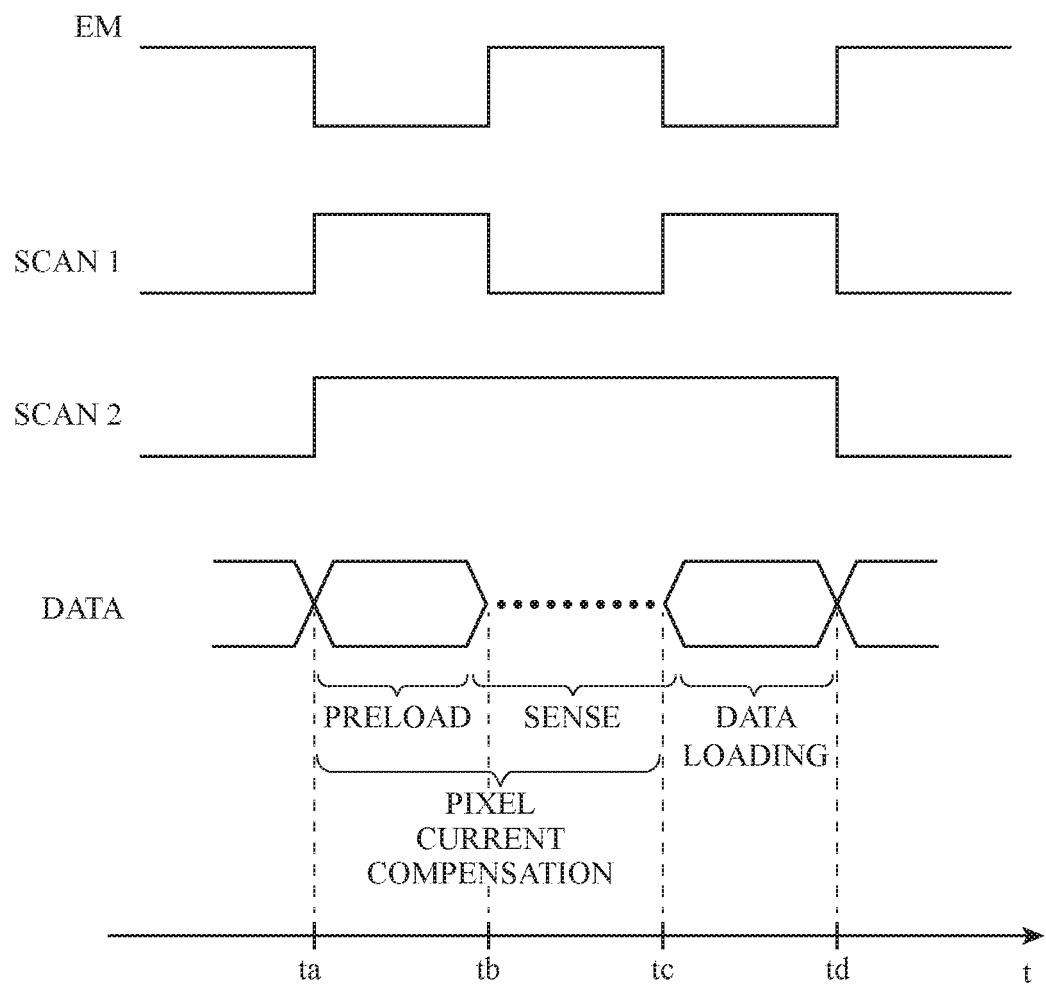
FIG. 8 is a signal timing diagram showing how pixel current compensation operations may be performed in accordance with an embodiment.

FIGS. 7 and 8 are illustrative signal timing diagrams for programming and compensating pixels 22 of FIG. 4 in a configuration in which (for example) transistors TE, TD, and SW2 are formed from silicon transistors and transistor SW1 is a semiconducting-oxide transistor. FIG. 7 shows illustrative signal states during programming. FIG. 8 shows illustrative signal states during current sensing for supporting pixel circuit drive transistor current variation compensation operations.

As shown in FIG. 7, emission signal EM may be asserted during emission operations (to allow current to flow through transistor TE and therefore through transistor TD). When it is desired to load data signals into pixels 22 (programming), emission signal EM may be deasserted. Control signals SCAN1 and SCAN2 may be turned on to load data from data line 154 (DATA) into pixel 22. When SCAN1 is asserted, transistors SW1 are turned on and gate nodes G are taken to reference voltage VREF. When transistors SW2 are turned on, source nodes S are loaded with data from respective data lines 54 (e.g., DATAR, DATAG, and DATAB in FIG. 4). The loaded data appears between the gate G and source S of transistor TD on storage capacitor Cst (which has one terminal coupled to gate G and another terminal coupled to source S). The data signal that is present at the end of the programming period when SCAN 2 is deasserted will be held on source nodes S by storage capacitors Cst. The programming operations of FIG. 7 may be used to load desired data values between the gate G and source S of each drive transistor TD, thereby placing drive transistors TD in desired states.

Illustrative drive transistor current variation compensation operations for pixels 22 are shown in FIG. 8. At times ta to tb, emission signal EM is deasserted, and SCAN1 and SCAN2 are asserted and predefined voltages are routed to the source nodes S via transistors SW2 while reference voltage Vref is loaded into gate nodes G. At times tb to tc, lines 54 are used as current sensing lines and current sensing circuitry 30" measures the current associated with each pixel 22. The sensed current information can be processed to determine how to compensate display 14 for variations in pixel current (e.g., due to threshold voltage variations, mobility variations, temperature variations, aging effects, etc.). In particular, sensed current information can be used to adjust the data values for weak pixels upwards and to adjust the data values for strong pixels downwards so that images are displayed in a uniform manner on display 14 during emission operations. Following the pixel current compensation operations of times ta to tc, pixels 22 may be loaded with data from the data lines (times tc to td). During times tc to td, SCAN1 is asserted to load VREF onto gate nodes G and SCAN2 is asserted to turn transistors SW2 on to load data from data lines 54 onto respective source nodes S. This ensures that desired Vgs levels are established for drive transistors TD by the time that SCAN2 is deasserted at time td.

Figure 9:
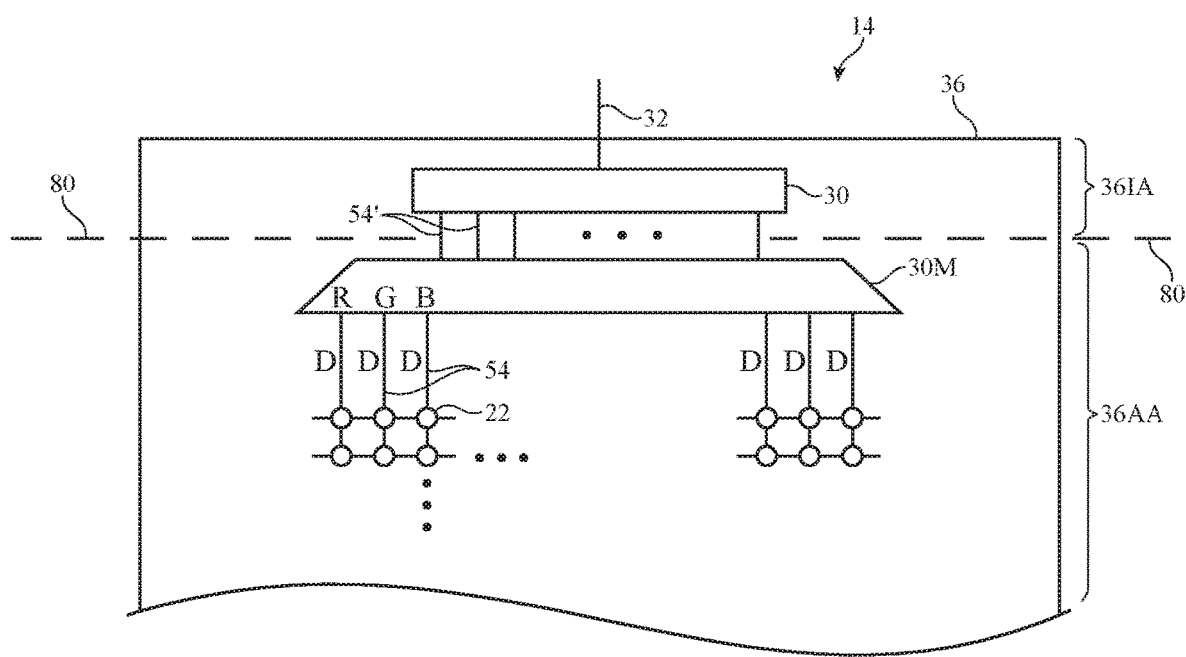
FIG. 9 is a diagram showing how data line demultiplexing circuitry may be used to reduce the number of data lines in a bent portion of the display substrate in accordance with an embodiment.

If desired, data line multiplexing schemes may be used to reduce the number of data lines near the edge of display substrate 36. Display substrate 36 and other layers in display 14 may be flexible (e.g. flexible polymer, etc.). In some scenarios, it may be desirable to bend an edge region of display substrate 36 (e.g., to bend display driver circuits out of the way to minimize the inactive border of display 14). In the illustrative scenario of FIG. 9, portion 361A of display substrate 36 is being bent out of the plane of main portion 36AA along bend line 80. The number of data line portions 54' that traverse the bent portion of substrate 36 (i.e., the number of lines 54' that overlap bend axis 80) may be minimized using demultiplexer circuitry 30M. Circuitry 30M may be, for example, thin-film transistor demultiplexer circuitry (a demultiplexer) that demultiplexes the data signals on each of lines 54' into three respective data signals on three respective lines in lines 54 (e.g., a first data signal for a column of red pixels 22R, a second data line for a column of blue pixels 22B, and a third data signal for a column of green pixels 22G). With this type of arrangement, the number of lines 54' that cross bend axis 80 will be a third of the number of lines 54 in the active area of display 14. Other amounts of demultiplexing (more than 1:3 or less than 1:3) may be used, if desired.

In accordance with an embodiment, a display is provided that includes an array of pixels each of which includes a light-emitting diode, and circuitry that biases at least a given one of the light-emitting diodes to sense light.

In accordance with another embodiment, the circuitry biases at least one other of the light-emitting diodes to emit light while the given light-emitting diode is sensing light.

In accordance with another embodiment, each pixel has a pixel circuit with a drive transistor coupled in series with the light-emitting diode of that pixel and the drive transistor has a gate, a drain, and a source.

In accordance with another embodiment, the display includes data lines, each pixel circuit is associated with a respective one of the data lines and each pixel circuit has a switching transistor having a first terminal coupled to the data line associated with that pixel circuit and a second terminal coupled to the source of the drive transistor of that pixel circuit.

In accordance with another embodiment, the display includes a shared reference voltage path that is shared by all of the pixel circuits, each pixel circuit has an additional switching transistor that is coupled between the reference voltage path and the gate of the drive transistor in that pixel circuit.

In accordance with another embodiment, the drive transistor is a silicon transistor.

In accordance with another embodiment, the additional switching transistor is a semiconducting-oxide transistor.

In accordance with another embodiment, the switching transistor that has the first terminal coupled to the data line is a silicon transistor.

In accordance with another embodiment, the switching transistor that has the first terminal coupled to the data line is a semiconducting-oxide transistor.

In accordance with another embodiment, the display includes current sensing circuitry coupled to the data lines, the data lines serve as drive transistor current sense lines that the current sensing circuitry uses to sense current flow through the drive transistors of the pixels.

In accordance with another embodiment, the display includes a touch sensor, the circuitry deactivates at least some of the pixels in an area that is contacted by an external object while the given diode is sensing the light.

In accordance with another embodiment, the display includes a demultiplexer coupled to the data lines, and a display driver circuit that supplies data signals on signal lines that are coupled between the demultiplexer and the data lines.

In accordance with another embodiment, the display includes a substrate that is bent along a bend axis that is crossed by the signal lines.

In accordance with another embodiment, the light-emitting diodes include organic light-emitting diodes.

In accordance with another embodiment, the display includes a storage capacitor in each pixel circuit having a first terminal coupled to the gate and a second terminal coupled to the source.

In accordance with an embodiment, a display is provided that includes circuitry that supplies data and that senses current, an array of pixels each of which includes a light-emitting diode, and vertical lines that supply the data to the pixels from the circuitry during data loading operations and that pass current to be sensed to the circuitry.

In accordance with another embodiment, the display includes a shared reference voltage path that supplies the pixels with a reference voltage.

In accordance with another embodiment, each pixel includes a drive transistor coupled in series with the light-emitting diode of that pixel, the drive transistor has a gate, a source, and a drain.

In accordance with another embodiment, each vertical line is associated with a column of the pixels, each pixel in each of the columns includes a first transistor coupled between the reference voltage path and the gate of the drive transistor in that pixel and a second transistor coupled between the vertical line associated with that column of pixels and the source of the drive transistor in that pixel.

In accordance with another embodiment, a first set of the pixels in a given row of the pixels emits light while a second set of the pixels in the given row senses reflections of the emitted light from an external object.

In accordance with another embodiment, the light-emitting diodes include organic light-emitting diodes.

In accordance with another embodiment, the light-emitting diodes include light-emitting diodes selected from the group consisting of quantum dot light-emitting diodes and crystalline semiconductor die light-emitting diodes.

In accordance with an embodiment, an organic light-emitting diode display is provided that includes an array of pixels each of which includes a pixel circuit with a light-emitting diode, a drive transistor that is coupled to the light-emitting diode and that has a gate, source, and drain, and at least one switching transistor, the array of pixels has rows and columns of the pixels, horizontal lines, each row of the pixels has a corresponding set of the horizontal lines that supply control signals to the pixels, and vertical lines each of which is used during data loading operations and current sensing operations, the switching transistor of each pixel circuit is coupled between the source of the drive transistor and a respective one of the vertical lines.

In accordance with another embodiment, the horizontal lines control the switching transistors to forward bias some of the light-emitting diodes to emit light and to reverse bias some of the light-emitting diodes to detect the light after the light has reflected from an external object.

The foregoing is merely illustrative and various modifications can be made by those skilled in the art without departing from the scope and spirit of the described embodiments. The foregoing embodiments may be implemented individually or in any combination.

What is claimed is:

1. A display configured to display images, the display comprising:
    an array of pixels each of which includes an organic light-emitting diode, at least one silicon transistor, and at least one semiconducting-oxide transistor;
    touch sensor circuitry configured to detect a finger overlapping a region of the display; and
    circuitry configured to:
        in response to detecting the finger, deactivate pixels in the region of the display that is overlapped by the finger while other pixels in the array remain active;
        while the pixels are deactivated and in response to detecting the finger, bias at least a given one of the organic light-emitting diodes to sense light reflected by the finger; and
        detect a fingerprint of the finger based on the sensed light.

2. The display defined in claim 1 wherein the circuitry biases at least one other of the organic light-emitting diodes to emit light while the given organic light-emitting diode is sensing light.

3. The display defined in claim 2 wherein each pixel has a pixel circuit with a drive transistor coupled in series with the organic light-emitting diode of that pixel and wherein the drive transistor has a gate, a drain, and a source.

4. The display defined in claim 3 further comprising data lines, wherein each pixel circuit is associated with a respective one of the data lines and wherein each pixel circuit has a switching transistor having a first terminal coupled to the data line associated with that pixel circuit and a second terminal coupled to the source of the drive transistor of that pixel circuit.

5. The display defined in claim 4 further comprising a shared reference voltage path that is shared by all of the pixel circuits, wherein each pixel circuit has an additional switching transistor that is coupled between the reference voltage path and the gate of the drive transistor in that pixel circuit.

6. The display defined in claim 5 wherein the drive transistor is a silicon transistor.

7. The display defined in claim 6 wherein the additional switching transistor is a semiconducting-oxide transistor.

8. The display defined in claim 7 wherein the switching transistor that has the first terminal coupled to the data line is a silicon transistor.

9. The display defined in claim 7 wherein the switching transistor that has the first terminal coupled to the data line is a semiconducting-oxide transistor.

10. The display defined in claim 5 further comprising current sensing circuitry coupled to the data lines, wherein the data lines serve as drive transistor current sense lines that the current sensing circuitry uses to sense current flow through the drive transistors of the pixels.

11. The display defined in claim 5 further comprising:
a demultiplexer coupled to the data lines; and
a display driver circuit that supplies data signals on signal lines that are coupled between the demultiplexer and the data lines.

12. The display defined in claim 11 further comprising a substrate that is bent along a bend axis that is crossed by the signal lines.

13. The display defined in claim 5 further comprising a storage capacitor in each pixel circuit having a first terminal coupled to the gate and a second terminal coupled to the source.

14. A display configured to display images, the display comprising:
circuitry that supplies data and that senses current;
touch sensor circuitry configured to detect an external object overlapping a region of the display;
an array of pixels each of which includes a light-emitting diode, wherein a first set of the pixels in a given row of the pixels emits light and a second set of the pixels in the given row senses the light emitted by the first set of pixels after the light reflects from the external object, wherein the circuitry captures a scan of the external object based on the sensed light, and wherein the circuitry is configured to, in response to detecting the external object overlapping the region of the display, deactivate the pixels in the region of the display while other pixels in the array remain active;
vertical lines that supply the data to the pixels from the circuitry during data loading operations and that pass current to be sensed to the circuitry; and
a shared reference voltage path that supplies the pixels with a reference voltage.

15. The display defined in claim 14 wherein each pixel includes a drive transistor coupled in series with the light-emitting diode of that pixel, wherein the drive transistor has a gate, a source, and a drain.

16. The display defined in claim 15 wherein each vertical line is associated with a column of the pixels, wherein each pixel in each of the columns comprises a first transistor coupled between the reference voltage path and the gate of the drive transistor in that pixel and a second transistor coupled between the vertical line associated with that column of pixels and the source of the drive transistor in that pixel.

17. The display defined in claim 16 wherein the light-emitting diodes comprise organic light-emitting diodes.

18. The display defined in claim 16 wherein the light-emitting diodes comprise light-emitting diodes selected from the group consisting of: quantum dot light-emitting diodes and crystalline semiconductor die light-emitting diodes.

19. An organic light-emitting diode display configured to display images, the display comprising:
touch sensor circuitry configured to detect an external object overlapping a region of the organic light-emitting diode display;
an array of pixels each of which includes a pixel circuit with a light-emitting diode, a drive transistor that is coupled to the light-emitting diode and that has a gate, source, and drain, and at least one semiconducting-oxide switching transistor, wherein the array of pixels has rows and columns of the pixels, and wherein a first set of the light-emitting diodes emits light and a second set of the light-emitting diodes detects the light emitted by the first set of the light-emitting diodes after the light has reflected from the external object;
circuitry that detects gesture input on the display based on the detected light, wherein the circuitry is configured to, in response to detecting the external object overlapping the region of the display, deactivate the pixels in the region while other pixels in the array remain active;
horizontal lines, wherein each row of the pixels has a corresponding set of the horizontal lines that supply control signals to the pixels; and
vertical lines each of which is used during data loading operations and current sensing operations, wherein the switching transistor of each pixel circuit is coupled between the source of the drive transistor and a respective one of the vertical lines.

20. The organic light-emitting diode display defined in claim 19 wherein the horizontal lines control the switching transistors to forward bias the first set of light-emitting diodes to emit the light and to reverse bias the second set of light-emitting diodes to detect the light after the light has reflected from the external object.

* * * * *